April 5, 1938.   R. A. BRADEN   2,113,395
AUTOMATIC FIDELITY CONTROL CIRCUITS
Filed May 25, 1935   4 Sheets-Sheet 1

Fig. 1

INVENTOR
RENE A. BRADEN
BY
ATTORNEY

April 5, 1938.  R. A. BRADEN  2,113,395
AUTOMATIC FIDELITY CONTROL CIRCUITS
Filed May 25, 1935  4 Sheets-Sheet 2

INVENTOR
RENE A. BRADEN
BY
ATTORNEY

April 5, 1938.  R. A. BRADEN  2,113,395
AUTOMATIC FIDELITY CONTROL CIRCUITS
Filed May 25, 1935   4 Sheets-Sheet 4

INVENTOR
RENE A. BRADEN
BY
ATTORNEY

Patented Apr. 5, 1938

2,113,395

UNITED STATES PATENT OFFICE 2,113,395

AUTOMATIC FIDELITY CONTROL CIRCUITS

Rene A. Braden, Collingswood, N. J., assignor to Radio Corporation of America, a corporation of Delaware Application May 25, 1935, Serial No. 23,470

16 Claims. (Cl. 250—20)

My present invention relates to fidelity control arrangements for signalling systems, and more particularly to automatic fidelity control systems for radio receivers.

Radio broadcast receivers of present commercial types are, in general, the result of compromises in design between two mutually exclusive characteristics, e. g., sufficient selectivity to differentiate between incoming signals under maximum and minimum sensitivity conditions, and sufficient fidelity to provide natural reproduction of the higher audio frequencies. While a fair degree of fidelity had been attained in the prior art through the use of inter-tube coupling circuits having band pass characteristics, it was considered difficult to design radio receivers, especially those provided with automatic volume control, that would exhibit a high degree of fidelity as well as reasonable selectivity, when receiving strong signals, and still be sufficiently selective to receive weak signals without an unpleasant amount of interference and background noise.

In my copending application Serial No. 10,981, filed March 14, 1935 Patent No. 2,053,762, of September 8, 1936, there are disclosed automatic fidelity control systems which involve the automatic regulation of the gain of sharp and broad amplifiers in such a manner that the gain of the sharp amplifier decreases at a more rapid rate than the broad amplifier when strong signals are received.

One of the main objects of my present invention is to provide improved automatic fidelity control circuits utilizing electron discharge tube amplifiers of special design, the amplifiers being operatively associated with signal transmission paths of sharp and broad selectivity characteristics, and the geometry of the amplifier tubes being such that variations in received signal amplitude may be utilized to vary the sensitivity-fidelity characteristics of the signal transmission paths by varying the electronic flow through different portions of the amplifier tubes.

Another important object of the present invention is to utilize electron discharge tubes of the exponential, or variable mu, type as amplifiers, the amplifier tubes being constructed to feed signal channels having different selectivity characteristics, and the signal transmission through the channels being regulated by automatic variation of the flow of parallel electron streams within each of the amplifiers.

Another object of the invention is to provide various tube constructions which are readily adapted for use in connection with radio receiving systems which comprise parallel sharp and broad signal transmission channels, and which tube constructions are of the variable mu type.

And still other objects of the invention are to improve generally the simplicity and efficiency of fidelity control systems for radio receivers, and more especially to provide such control systems which are not only reliable and efficient in operation, but economically constructed and assembled in radio receivers.

The novel features which I believe to be characteristic of my invention are set forth in particularity in the appended claims, the invention itself, however, as to both its organization and method of operation will best be understood by reference to the following description taken in connection with the drawing in which I have indicated diagrammatically several circuit organizations whereby my invention may be carried into effect.

In the drawings:

Fig. 3 is a schematic representation of a tube construction which may be utilized for tube 9 of Fig. 1.

Figure 1:
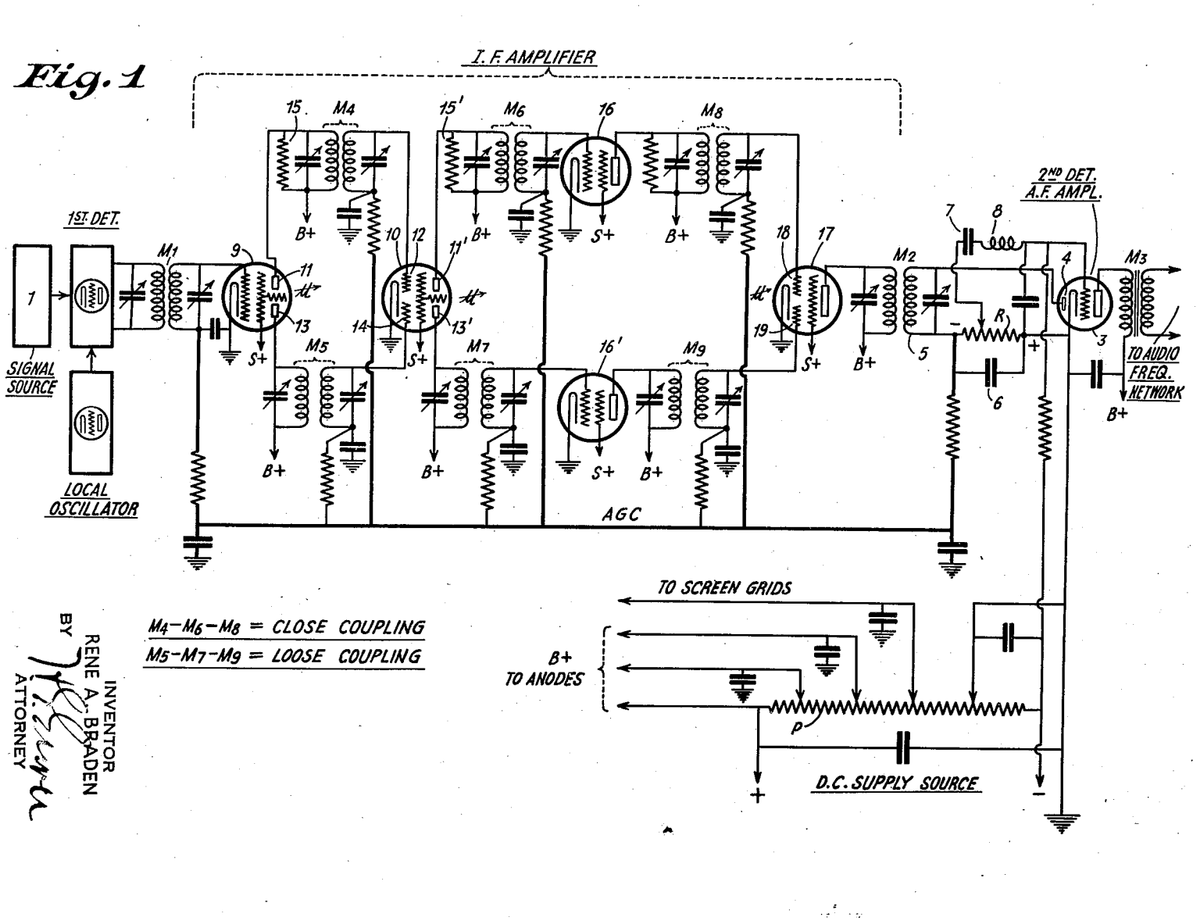
Fig. 1 diagrammatically shows a radio receiving circuit including an intermediate frequency amplifier system embodying various tube constructions according to the present invention, Fig. 2 graphically represents the characteristics of the coupling network between tubes 9 and 10 of Fig. 1.

Referring now to the accompanying drawings, wherein like reference characteristics in the different figures correspond to similar circuit elements, there is shown in Fig. 1 a circuit diagram of a superheterodyne receiver which embodies a plurality of signal transmission networks, any of which may be utilized in practicing the present invention. The superheterodyne receiver is of a conventional type in its essential elements, and may comprise a customary signal source 1, such as a signal collector of the grounded antenna type. The source 1 may, also, include one, or more, stages of tunable radio frequency amplification, and the output of the radio frequency amplifier is impressed upon the usual frequency changer network. This network may comprise a first detector tube which is independent of the local oscillator tube; alternatively, the local oscillator and first detector may be of the combined local oscillator—first detector type and utilize, if desired, a pentagrid converter tube of the 2A7 type. It is to be clearly understood that the nature of the networks preceding the input of the intermediate frequency amplifier may be suited to the purpose of the set designer. The essential thing in the design of the receiver shown in Fig. 1 is to impress upon the input transformer $M_1$, which has its primary and secondary windings each tuned to the operating intermediate frequency, intermediate frequency energy of a substantially constant frequency over the entire tuning range of the receiver. This frequency may be of any value desired, and may have a value, for example, of 450 kilocycles, as is now common practice.

The intermediate frequency amplifier includes a plurality of networks which will be described in detail at a later point. The output of the last intermediate frequency amplifier tube is transmitted to the second detector network through a transformer $M_2$. The latter has its primary and secondary circuits tuned to the operating intermediate frequency. The second detector network utilizes a diode rectifier, and the electrodes of the diode are the cathode of tube 3 and the diode anode 4. The tube 3 is a tube of the multiple function type, and may be a 55 or 85 type tube. By way of illustration, and in order to simplify the drawings, the tube 3 is shown as including a single diode section and a triode section. Those skilled in the art will readily appreciate the fact that the triode section may be replaced by a pentode section, and that more than one diode section can be utilized. Between the diode anode 4 and the cathode of tube 3 there is connected in series the tuned input circuit 5 and the diode load resistor R. The resistor R is shunted by an intermediate frequency by-pass condenser 6.

The triode section of tube 3 functions as an audio frequency amplifier, and the signal grid thereof is connected to a desired point on resistor R through a series path which includes the condenser 7 and coil 8. The connection to the load resistor may be made adjustable so that the adjustable connection can function as a manual volume control device. An intermediate frequency by-pass condenser is connected between the signal grid of tube 3 and the positive side of resistor R, and the function of condenser 7 and coil 8 is to suppress the intermediate frequency component of rectified signal current. The audio frequency currents flowing in the plate circuit of tube 3 are transmitted to the following audio frequency network through the coupling transformer $M_3$, and it will be understood that the audio network may comprise one, or more, additional stages of audio amplification, a reproducer being employed for utilizing the amplified audio energy.

In order to show the manner in which the various direct current energizing voltages are supplied to the tubes of the receiving system shown in Fig. 1, there is shown in Fig. 1 the D. C. supply source for the various electrodes of the electron discharge tubes of the system. It is not believed necessary to explain the manner of connecting the various electrodes of the tubes in the receiving system to the voltage supply bleeder P. Those skilled in the art will readily recognize the manner of making these various connections from the designations noted on Fig. 1.

Considering now the specific constructions of the intermediate frequency amplifier system, it will be observed that it comprises four cascaded stages. The first of these stages includes the electron discharge tube 9 which comprises in addition to the usual cathode, signal input grid, and screen grid, a divided plate. The representation of tube 9 in Fig. 1 is functional in nature; the specific construction of a tube of this type will be shown at a later point in the specification. It will be sufficient for the present to point out that the tube is one whose signal grid is constructed in such a manner as to impart a variable mu characteristic to the tube. In place of utilizing a signal plate in the normal manner the plate is divided into two parts, and the screen grid electrode not only shields the two anodes from the remaining electrodes, but also is constructed to shield the two anodes from each other. The I. F. amplifier tube 10 following tube 9 differs in construction from the latter in that the signal input grid is also divided. The tube 10, however, is also of the variable mu type, and a designation has been shown in Fig. 1 adjacent both representations of the tube to designate that these tubes are of this specific type.

The intermediate frequency energy is impressed between the input electrodes of tube 9; the output energy of the tube is divided between two signal transmission paths. One of these paths includes the coupling transformer $M_4$ which has its primary and secondary circuits each tuned to the intermediate frequency. The tuned primary circuit of transformer $M_4$ is disposed in the plate current connection to the plate 11 of tube 9, while the tuned secondary circuit of the transformer is connected in circuit with the grid 12 of tube 10. The co-efficient of coupling between the primary and secondary circuits of transformer $M_4$ is given a value such that the resonance curve characteristic of the network including the tuned circuits of transformer $M_4$ will be broad and have a substantially flat top. In other words, the coupling value of the tuned primary and secondary circuits of transformer $M_4$ is such that a broad band of signal frequencies will be transmitted through that network.

The second signal transmission path between tubes 9 and 10 comprises transformer $M_5$ which is provided with resonant primary and secondary circuits each tuned to the intermediate frequency. The tuned primary circuit of transformer $M_5$ is connected in the plate current circuit to the plate 13 of tube 9, and the tuned secondary circuit of this transformer is connected in circuit with grid 14 of tube 10. The coupling between the primary and secondary circuits of transformer $M_5$ is relatively loose, and is given a value such that a narrow band of signal frequencies will be transmitted through this network. In order to emphasize the difference in coupling of the circuits of networks $M_4$ and $M_5$ the spacing between the windings of these networks has been shown as different, and that between the windings of transformer $M_5$ has been shown as further apart to denote that the coupling in this case is relatively loose. A resistor 15 is connected across the tuned primary circuit of transformer $M_4$ in order to improve the wide band transmission characteristic of coupling network $M_4$.

The amplifier tube 10 is followed by a pair of screen grid tubes 16 and 16' arranged in parallel, the signal input circuit of tube 16 being coupled to the plate 11' of tube 10 through a coupling network $M_6$ whose design is similar to that of coupling network $M_4$. It will be noted that resistor 15' is connected across the tuned primary circuit of coupling network $M_6$ for the same purpose as in the case of resistor 15. The signal input grid of amplifier tube 16' is coupled to the plate 13' of tube 10 through coupling network $M_7$ whose design is similar to that of coupling network $M_5$. The final intermediate frequency amplifier tube 17 is a screen grid tube having a pair of divided grids, one of the grids 18 being connected to the plate circuit of amplifier 16 through a coupling network $M_8$. The design of coupling network $M_8$ is substantially similar to that of networks $M_4$ and $M_6$. The signal grid 19 of tube 17 is coupled to the plate circuit of amplifier 16' through a coupling network $M_9$ whose design is similar to that of networks $M_5$ and $M_7$.

It will, therefore, be observed that coupling networks $M_4$, $M_6$ and $M_8$ each include circuits which are relatively closely coupled, whereas the coupling network $M_5$, $M_7$ and $M_9$ include circuits which are relatively loosely coupled. In this way there is provided between the input circuit of the intermediate frequency amplifier system and the output circuit thereof a pair of parallel signal transmission paths, one of the paths having a relatively broad selectivity characteristic, while the other path has a relatively sharp selectivity characteristic.

The signal transmission efficiency through these parallel paths may be differentially regulated by means of the automatic gain control connections provided between the signal input grid circuits of the various tubes of the intermediate frequency amplifier system and a source of direct current potential which is responsive in amplitude to received signal amplitude variations. These gain control connections are denoted in heavy lines in Fig. 1, and are generally designated by the symbol AGC. The connections are provided between each of the signal input grids of tubes 9, 10, 16, 16' and 17 and the negative side of diode rectifier load resistor R. It will be appreciated that as the received signal amplitude increases, the diode anode side of resistor R will increase in negative potential. Therefore, the negative bias on the signal grids of the various tubes of the I. F. amplifier system will increase. This increase in negative bias on each signal grid will affect the electron streams flowing through the signal grids in different manner. It is pointed out that the automatic gain control path includes proper resistor—condenser filter networks for suppressing pulsating current components, and since such devices are well known to those skilled in the art, it is considered sufficient to diagrammatically represent these filter networks in the circuit diagram of Fig. 1.

Figures 2, 3:
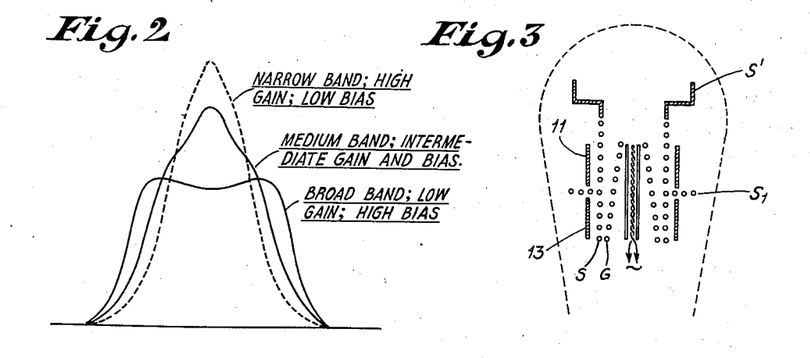

In order to clearly explain the functioning of the present invention, attention is directed to that portion of the I. F. amplifier system which includes tubes 9 and 10 and their coupling networks. In Fig. 2 there are graphically represented the resonance curve characteristics which are obtained by means of the present invention. These characteristics show that it is desired to have the broad band transmission characteristic between tubes 9 and 10 when receiving strong signals, while a narrow selectivity characteristic is secured when receiving weak signals. The nature of an intermediate characteristic is also depicted in Fig. 2 in order to show the effect of the resonance curve characteristics of coupling networks $M_4$ and $M_5$ when receiving signals of medium strength.

As stated heretofore tube 9 is a tube of the variable mu type, and one of the characteristics of a variable mu tube is that when the negative bias on the signal input grid is made sufficiently high, electron flow is confined to one end of the electrode system, and the amplification is correspondingly reduced. This phenomenon occurs by reason of the fact that the windings of the signal input grid in such a tube are closely spaced at one end and relatively widely spaced at the other end. The closely spaced end exerts the greatest amount of control upon the electron stream, so that a relatively small negative bias is sufficient to prevent electron flow through this portion of the grid, while a much greater negative bias would be required to prevent flow of electrons through the widely spaced portion of the grid to the adjacent portion of the plate. The tube 9 has two plates so placed that one collects the current which flows through the closely spaced portion of the grid, while the other collects the current which flows through the widely spaced part. The amplification of a signal in each plate circuit is controlled by the adjacent part of the grid, and varies with grid bias in the same way as the plate current.

The plate 11 of tube 9 is to be understood as being positioned in alignment with the widely spaced portions of the signal input grid, and this plate is coupled through network $M_4$ to the input grid 12 of tube 10. It will, therefore, be seen that when the negative bias on the signal input grid of tube 9 is high, the coupling network $M_4$ determines the selectivity of the portion of the I. F. amplifier system between tubes 9 and 10, the coupling network $M_5$ having substantially no effect since the electron flow to plate 13 is entirely cut off. This is the state of affairs for securing the broad band characteristic shown in Fig. 2.

On the other hand when the bias on the signal input grid of tube 9 has its minimum negative value, as when the receiver collects weak signals, both plates 11 and 13 of tube 9 receive plate current and the signal is transmitted to grids 12 and 14 of tube 10 through both coupling networks $M_4$ and $M_5$. In this case the component of the signal which is passed by way of plate 13 and grid 14 has the selectivity characteristic of coupling network $M_5$. However, the transmission through coupling network $M_4$ is still operative, and, therefore, the total effective signal impressed upon the input grids of tube 10 is the sum of the signal components through the broad and narrow band networks. The net effect, however, will be considerably sharper in selectivity, but reduced in fidelity, as compared with the first condition in which the loosely coupled network M₅ does not function.

The curves shown in Fig. 2 illustrate in a qualitative manner the characteristics under the two extreme conditions of signal intensity, and under the intermediate condition, of signal transmission between tubes 9 and 10 of the intermediate frequency amplifier system. Since the broad band condition would ordinarily be required only when the gain is very low, it is possible to make the low gain section of tube 9 relatively small (that is to say the plate 11 would have a smaller area than plate 13), and this would make the circuit 13—M₅—14 predominate under high gain conditions to such an extent that the broadening effect of circuit 11—M₄—12 on the net selectivity would be extremely small.

It is to be clearly understood that the geometry of the variable tube 9 may assume many different forms. It has been explained that the variable mu effect is imparted to tube 9 by using a signal input grid which has more widely spaced windings adjacent plate 11. Those skilled in the art are well aware at the present time of other constructions which will secure the desired variable mu characteristic. By way of illustration there is shown in Fig. 3 a schematic representation of an electron discharge tube construction which may be employed for the functions of tube 9. It will be noted from this schematic showing that the electrode structure includes, in addition to the divided plates 11 and 13, a conical signal control grid G.

The screen grid S is provided with an extensive shielding flat ring S₁ which functions to shield the plates 11 and 13 from each other. The symbol S' denotes the support structure for the screen grid S, and the tube envelope is shown in dotted outline about the electrodes. The variable mu characteristic is secured in this case because one end of the grid is close to the cathode while the other end is far from the cathode, the screen diameter being uniform. It is not believed necessary to explain the mode of operation of this form of tube, since those skilled in the art are fully aware of the fact that the conical configuration of signal control grid G will impart the desired variable mu characteristic to the tube. It is also possible to employ a signal control grid of uniform diameter, and pitch, of winding from end to end. Then, the screen grid is made conical in formation to secure the variable mu characteristic for tube 9. The plates 11 and 13 may be arranged in a conical configuration to secure the same characteristic, in case the tube is a triode.

Figure 4:
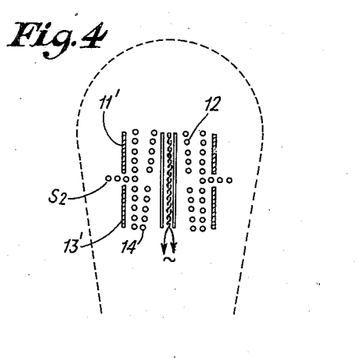
Fig. 4 is a schematic representation of a tube construction which may be utilized for tube 10 in Fig. 1.

The amplifier tube 10 in Fig. 1, differs in construction from tube 9 in that it additionally possesses divided grids 12 and 14. Fig. 4 shows a schematic representation of such a variable mu tube construction. The essential difference between the construction shown in Fig. 4 and that shown in Fig. 3 resides in the fact that the conical signal control grid is divided into two portions, and these portions correspond to the grids 12 and 14 of the tube 10 in Fig. 1. It will be observed that the screen grid is provided with the ring extension S₂ between plates 11' and 14' for electrostatic shielding of these plate sections. The two grids could be shielded from each other by a ring tied to cathode.

Instead of using for the tube 10 signal control grids 12 and 14 arranged in the tapered fashion with separate leads to each section, a variable pitch grid winding can be used in place of the variable diameter winding. Also, two grids of same diameter, but one fine in pitch and the other coarse, may be used. The variable mu characteristic can, also, be obtained by tapering the screen as pointed out heretofore. The operation of the tube shown in Fig. 4 should be readily understood from the previous explanation. With high bias upon each grid section 12 and 14 only one of the grid sections has control over plate current, the grid section having control serving to modify the impressed signal. Obviously, grid 12 must be the grid section which operates at high bias since at low gain the signal is impressed on this grid only. At high gain, that is to say with low grid bias, both grid sections 12 and 14 operate, and the signal is impressed on both.

Figure 5:
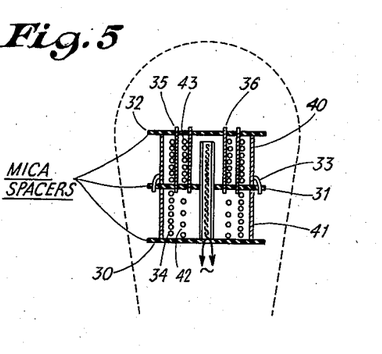
Fig. 5 is a modification of a tube construction of the type shown in Fig. 4.

The tapered signal control grid construction in Fig. 4 may be replaced by a construction such that the grid sections 12 and 14 are co-planarly arranged in either variable mu or standard screen grid tube construction. In the latter case the screen grid would be tapered. In Fig. 5 there is shown still another practical construction for tube 10 which may be utilized for this purpose in place of the tube construction shown in Fig. 4. A schematic representation is employed for this modification in order to render the present disclosure simple. The electrodes are supported by three parallel spaced mica discs 30, 31 and 32. The plate 40 is disposed between mica discs 32 and 31, and the lower peripheral portion of plate 40 is provided with hooks 33 to anchor plate 40 to the intermediate mica disc 31.

The plate 41 is disposed between mica discs 31 and 30. The screen grid electrode 34 is wound upon supporting rods 35 which extend through the two parallel mica discs 31 and 32. The signal control grid section is similarly wound upon the supporting rods 36. The supporting rods of the lower section of the grid 42 and of the screen that is between mica discs 30 and 31, go out through the front and rear of the tube construction, so that they do not show any cross-section and for this reason only the upper supporting rods 35 and 36 are shown. The two sections of the screen may be connected together, or may have separate leads.

Grids 43 and 42 are of uniform diameter; one having a finer mesh, or smaller winding pitch than the other. This gives the same effect as a tapered grid construction, and as a matter of fact is easier to manufacture. The plate is divided into two sections, and all the electrodes are separated and spaced by the three mica discs. The side rods 35 and 36 project through apertures in the mica discs 31 and 32, and similar side rods project through apertures in the mica discs 30 and 31 but the side rods of the upper and lower sections are displaced by 90°, and therefore, do not interfere with each other. It is to be understood that the grid sections in the case of tube 10 can be connected together externally when only the divided plate construction is desired, and conversely the divided plates can be externally connected where only the divided grid construction is desired. It will thus be appreciated that these tube constructions are readily interchangeable in function.

Returning again to the circuit diagram shown in Fig. 1, and considering now more specifically amplifier tubes 16 and 16', it will be observed that they amplify the signals passing through the channels of different selectivity electrically associated therewith. It is pointed out that this type of network is shown in the intermediate frequency amplifier of Fig. 1 in order to demonstrate that the present invention is capable of wide variation. The gain of each of these transmission paths is regulated by the AGC connections, and the outputs of each of tubes 16 and 16' is impressed upon the grids 18 and 19 of tube 17. The tube is a divided grid—single plate tube upon which is impressed the combined output of the two signal transmission channels.

Figure 6:
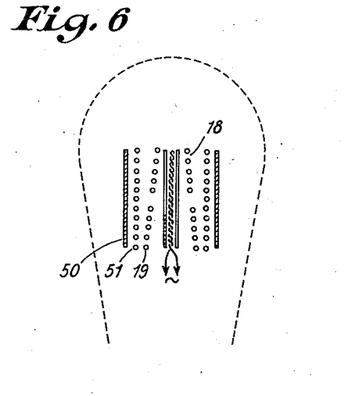
Fig. 6 is a schematic representation of a tube construction which may be used for tube 17 of Fig. 1.

The construction of tube 17 may assume various forms, just as in the case of tubes 9 and 10. As pointed out heretofore, there may be utilized for tube 17 a tube constructed in the manner shown in connection with tube 10, the divided plates being connected together externally to furnish the circuit associated with tube 17. However, in Fig. 6 there is schematically shown an electrode construction which may be used for tube 17. It will be seen that this tube construction is quite similar to that shown in Fig. 4, with the exception that the plate 50 is not divided, and the screen grid 51 is not provided with an electrostatic shielding ring as in the case of Fig. 4. The signal control grid sections 18 and 19 are arranged in tapered manner. In this way a variable mu characteristic is imparted to tube 17. It is not believed necessary to explain the functioning of tube 17, since this should be clear from the explanations given in connection with tubes 9 and 10.

Figure 7:
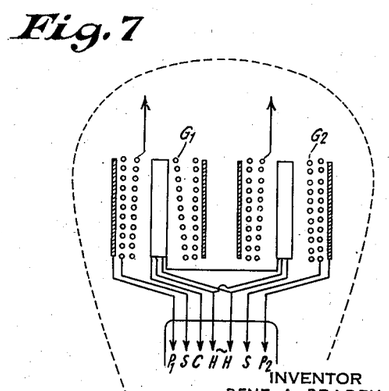
Fig. 7 is a schematic illustration of a modified tube construction which may be used for any of tubes 9, 10 and 17 of Fig. 1.

In Fig. 7 there is shown still another modified type of tube construction which may be utilized to provide any of the tube circuit arrangements shown in connection with tubes 9, 10 and 17. The electrodes of this modification are schematically represented, and they represent two matched variable mu tube elements, so designed, that if placed end to end they would work as a full-sized variable mu tube. It will be noted that the signal control grid $G_1$ of one of the tubes has a narrower tapered diameter than the other grid $G_2$. The various leads from the electrodes of the tubes have been lettered to denote the plates $P_1$ and $P_2$; the screen grid leads are denoted by the symbol S, the cathode lead is denoted by the symbol C. The heater leads for the internally heated cathodes of the two tube sections are denoted by the reference letter H.

By virtue of the electrode construction the tube shown in Fig. 7 can be made to operate in the same manner as the tube in Fig. 4, the portion containing $G_1$, corresponding to the upper part of Fig. 4 (11' and 12), and the portion containing $G_2$ corresponding to the lower part of Fig. 4, (13' and 14). By providing separate leads from the two grids and the two plates, it is possible to utilize the tube construction shown in Fig. 7 for any of the purposes shown in connection with tubes 9, 10 and 17 of Fig. 1. It is believed that the manner of connecting a tube of the type of construction shown in Fig. 7 will be clear to anyone skilled in the art from the aforegoing discussion of the various tube constructions and the utilization in the circuit of Fig. 1. Any other variable mu construction can be used in place of the conical grids. For example, cylindrical grids of different pitches, or of variable pitch, or conical screens may be used.

Figure 8:
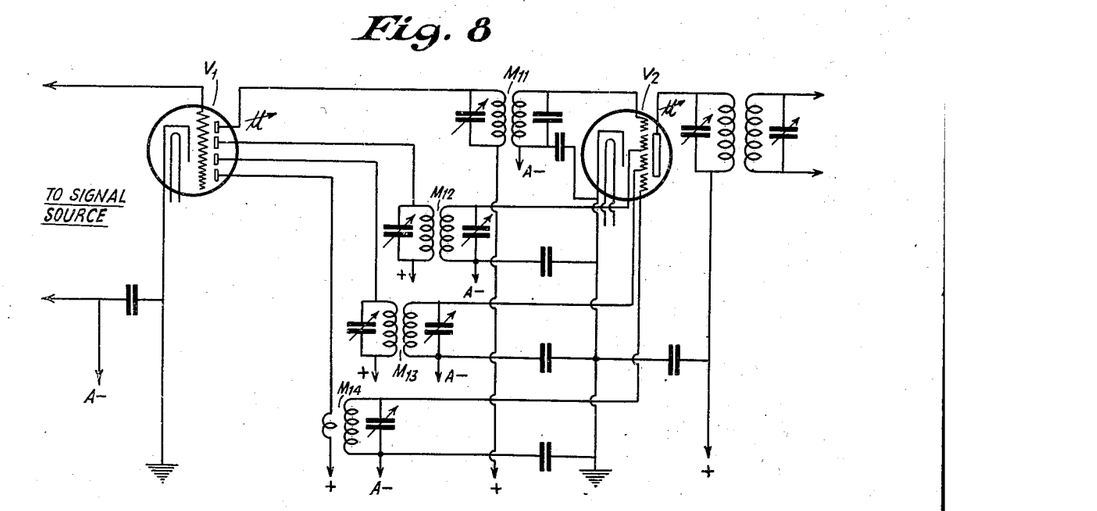
Fig. 8 is a circuit diagram of a signal transmission network employing variable mu tubes of modified construction.

It is within the scope of the present invention to utilize more than two plates within a single electron discharge tube of the variable mu type, or to utilize more than two signal input grids, both for the purposes to which tubes 9, 10 and 17 have been applied. Thus, there is shown in Fig. 8 a portion of a signal amplifier system, and it is to be understood that this may be a section of the intermediate frequency amplifier system of a superheterodyne receiver. The first tube $V_1$ is of the variable mu type which includes a plurality of plate electrodes. Merely by way of illustration the plate of the tube has been shown as divided into four sections. A common signal input grid is utilized, and it will be understood that the variable mu characteristic can be obtained in any fashion disclosed heretofore. For example, the signal input grid may be given a conical configuration, or the spacing between windings may progressively decrease along the axis of the grid.

The following tube $V_2$ is shown as having its signal input grid divided into four sections, each section corresponding to its respective plate section of tube $V_1$. A common output plate is used in tube $V_2$, while the tuned coupling networks $M_{11}$, $M_{12}$, and $M_{13}$, and $M_{14}$ couple each plate section of tube $V_1$ to its respective grid section of tube $V_2$. The grid sections of tube $V_2$ may be constructed along any of the lines shown in the modifications disclosed hereinbefore. By way of example, it is pointed out that the four sections may be provided from a single grid of variable pitch. Of course, a tapering grid may be divided into four sections. As explained before, the coupling magnitude of each of the coupling networks between tubes $V_1$ and $V_2$ is definitely correlated to the geometry of the tubes $V_1$ and $V_2$. $V_1$ and $V_2$ may be a tube with grid and plates both divided; all grids being connected together to make $V_1$, plates being connected to make $V_2$.

The signal input grid circuit of tube $V_1$, and each of the signal grid circuits of tube $V_2$, are connected to a source of variable negative grid bias A, as shown in connection with Fig. 1. This variable bias source may be automatically operated in accordance with signal amplitude variation, or may even be manually adjustable. In this way, the transmission characteristic of the coupling network between tubes $V_1$ and $V_2$ may be gradually varied as the negative grid biases are varied. It should be understood that it is within the scope of the present invention to secure the characteristics shown in Fig. 2, or conversely, to provide an amplifier which has high selectivity with low gain, or low selectivity with high gain.

Figure 9:
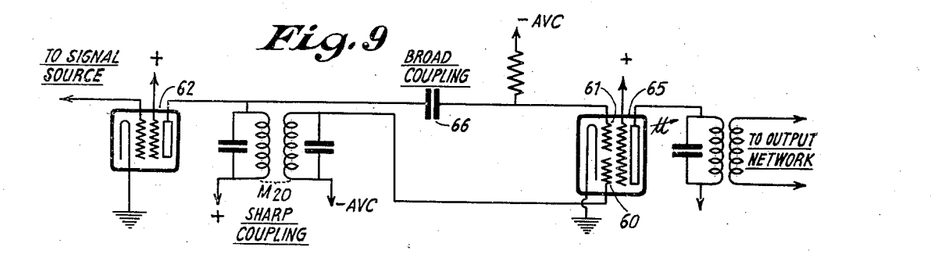
Fig. 9 shows a modified form of coupling network which may be utilized with the present invention.

The present invention is not restricted to the coupling devices shown in Fig. 1 or in Fig. 8. That is to say, the couplings between the amplifier tubes may be provided by devices other than transformers. For example, there is shown in Fig. 9 a coupling network between the signal input amplifier 62 and the variable mu tube 65 of the divided grid type, which coupling network comprises combined transformer and condenser coupling. The transformer $M_{20}$ has its tuned circuits each resonated to the operating signal frequency, and the co-efficient of coupling between the tuned windings of the transformer is less than critical coupling. A sharp selectivity characteristic is thereby imparted to the coupling network, with respect to the signal voltage developed across the secondary circuit and impressed on grid 60 of tube 65. The selectivity characteristic with respect to the voltage across the primary tuned circuit is a flat top curve, or a double humped curve, by virtue of the reactions of the secondary tuned circuit on the primary circuit.

The signal input to grid 61 therefore has a broad band frequency characteristic. Grids 61 and 60 are connected to the gain control bias voltage source, and at high bias only the signal on grid 61 is effective, and there is transmitted to the output of tube 65 a broad band of frequencies. With low bias, that is with weak signal reception, the grid 60 has a predominant effect, and the output of tube 65 contains a narrow band of frequencies. Of course, at intermediate bias settings intermediate frequency selectivity characteristics are obtained. The modification shown in Fig. 9 is independent of the nature of the variable mu tube 65, and it is to be understood that any of the variable mu tube constructions disclosed hereinbefore can be employed in that position.

Figure 10:
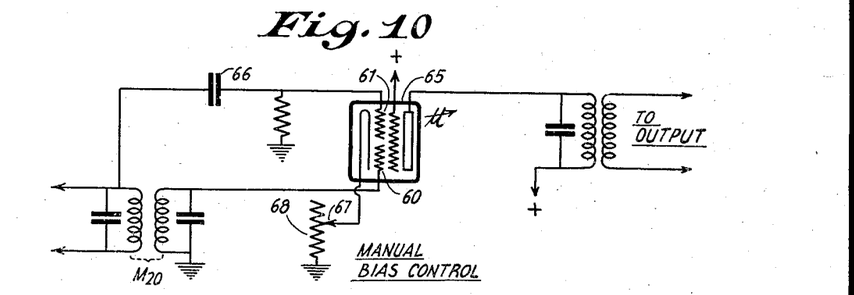
Fig. 10 shows a modified arrangement for securing bias control in accordance with the present invention.

Fig. 10 shows a modified form of the invention, specifically applied to tube 65 of Fig. 9, and wherein the bias for the two grids 61 and 60 is obtained by varying the voltage of the cathode of tube 65 with respect to ground. This is accomplished by connecting the cathode lead to an adjustable tap 67 which is slidable over a grounded resistor 68. Grids 61 and 60 are grounded, and it will therefore be seen that variation of the position of slidable tap 67 on resistor 68 will vary the negative bias of each of grids 61 and 60. The tap 67 is manually adjustable; there is thus provided an arrangement for manually varying the fidelity characteristic. It is obvious that any of the coupling networks to tube 65, shown in a previous portion of this specification, may be used in place of that shown in Fig. 10. Furthermore, any of the variable mu tube constructions hereinbefore disclosed may be used in place of tube 65. In general, the results of the present invention may be secured either automatically or manually by varying the bias of the signal control grids. In the case of automatic control a common source of automatic gain control voltage may be used, or independent control voltage sources may be employed. Again, the nature of the coupling network between amplifier tubes may be varied as shown in connection with Fig. 9.

Figures 11, 12:
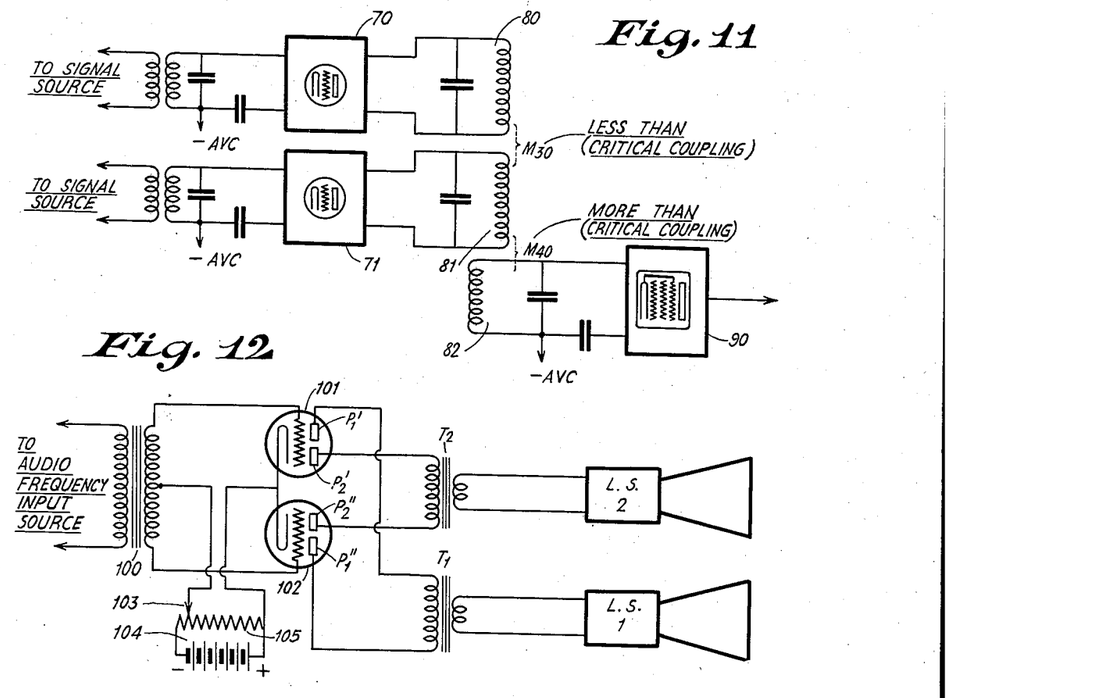
Fig. 11 illustrates a modification of the coupling network shown in Fig. 9.
Fig. 12 shows an audio frequency transmission network embodying the present invention.

Another modification of a coupling network between amplifier tubes is disclosed in Fig. 11. In this case the numerals 70 and 71 denote, in general, a pair of amplifier tube constructions. It is to be understood that these two representations may designate separate tubes of the 58 or pentode type or they may be of the type shown in Fig. 7 where the sections are independently biased. The significance of Fig. 11 resides in the particular construction of the coupling network between the amplifiers 70, 71 and the output amplifier 90.

The amplifier 70 includes in its output the circuit 80 which is tuned to the operating signal frequency; the amplifier 71 includes in its output the tuned circuit 81 which is resonated to the operating signal frequency. The signal tuned circuit 82 is connected to the input of amplifier 90, and is coupled to the circuit 81 by the coupling $M_{40}$ which is more than critical. The coupling between circuits 80 and 81 is denoted by the symbol $M_{30}$ and is less than critical. Thus, the selectivity characteristic between circuits 80 and 81 is sharp, and the characteristic between circuits 81 and 82 is broad. The coupling between circuits 80 and 82 is substantially reduced to zero by proper location of the coils of these circuits, and/or shielding, or proper bucking coupling windings. Any of these devices is known to those skilled in the art, and may be utilized to keep the coupling magnitude between circuits 80 and 82 substantially at zero.

The input circuits of amplifier sections 70 and 71 are connected to the source of variable negative voltage, and as explained heretofore, this may be a manually or automatically regulated source of voltage. Specifically the source has been denoted by the symbols AVC to denote that it is automatic in response to received signal amplitude variations. In order to secure a sharp selectivity characteristic, as when receiving weak signals, the amplifier section 70 is operative and transmits the signal energy to circuit 80, while the amplifier section 71 is biased off. Therefore, the loose coupling $M_{30}$ imparts the sharply selective characteristic to the network, even though the coupling $M_{40}$ is more than critical.

On the other hand for broad tuning the amplifier section 70 is biased off, and amplifier 71 is permitted to amplify the signal. In that case the close coupling $M_{40}$ is operative, and imparts the broad band characteristic to the coupling network. For optimum results the amplifier section 71 should have a low $R_p$, or sufficient damping should be used in circuits 81 and 82, and circuit 80 merely helps slightly broaden the characteristic curve and hold down the amplification at the center of the curve. The operation of the amplifiers 70, 71 from a common source of AVC voltage should be clear from the preceding description and Fig. 1, where such common source is desired.

In Fig. 1 the couplings $M_6$ and $M_7$ have been shown connected to different amplifier tubes or load circuits so as to divide the signal between two outgoing channels. The operation of the gain control bias then causes the signal to flow in both channels when the bias is low; through solely one channel when the bias is high; through one channel with practically normal intensity, and through the other channel with reduced intensity, when the bias is between its extreme values. Such an arrangement can be employed in a double loud speaker system in which the two speakers handle different frequency bands. In such a case the input transformers are audio frequency transformers instead of radio frequency transformers. Such an audio frequency network may also be used in a system having combined gain and tone control with the double output combined and fed to a single loud speaker. In this case the low gain circuit may have high peaks at low and high frequencies, and the high gain circuit a flat response curve. This combination would then give the effect commonly sought for in tone control circuits which aim to vary the fidelity in accordance with loudness to match the characteristics of the human ear. Of course push-pull circuits could be employed in such an audio amplifier system, if desired.

In Fig. 12 there is shown such an audio frequency transmission network wherein the transformer 100 has its primary winding connected to any desired source of audio frequency input energy. The tubes 101 and 102 are each triodes of the variable mu type, and it will be observed that they are both of the divided plate type. The specific construction of each of these tubes may follow the form of Fig. 3 if desired. The signal input grids of tubes 101 and 102 are connected to opposite sides of the secondary winding of input transformer 100, and there is provided a variable source of gain control voltage for the tubes. This gain control voltage source comprises the current source 104 which has connected thereacross a resistor 105. The positive side of resistor 105 is connected to the common cathode lead of the two tubes, while the center tap of the secondary winding of transformer 100 is connected to an adjustable tap 103 which is slidable over resistor 105.

A pair of loud speakers are provided for the two tubes, and loud speaker LS1 is coupled to plates $P'_1$ and $P''_1$ of tubes 101 and 102 respectively, through transformer $T_1$. Loud speaker LS2 is coupled to plates $P'_2$ and $P''_2$ through the coupling transformer $T_2$. In each of the two tubes shown in Fig. 12 the plates $P_1$ are plates which cut off first when the bias voltage on the input grids is increased; whereas the plates $P_2$ are those which operate after the other plates have been cut off. Suitable power amplifiers may be interposed between $T_1$ and LS1, and between $T_2$ and LS2, tubes 101 and 102 operating then as voltage amplifiers of small power output.

Figure 13:
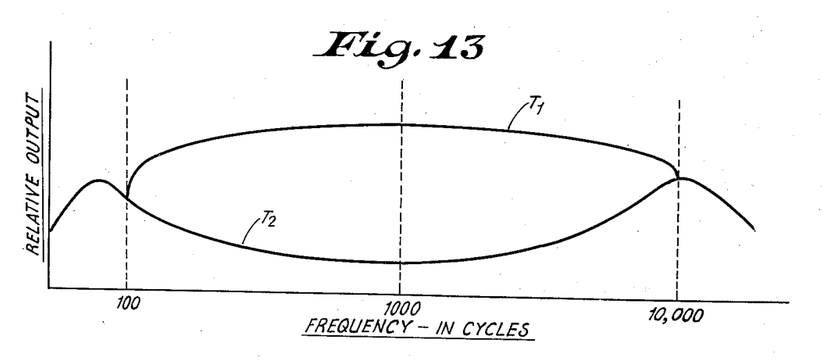
Fig. 13 shows the audio transmission characteristics of the system of Fig. 12.

The audio frequency transmission characteristic of the network including transformer $T_1$ and its associated loud speaker is denoted by the convex curve $T_1$ in Fig. 13. It will be observed that this characteristic has a convex shape between 100 and 10,000 cycles. The audio transmission characteristic of the network comprising transformer $T_2$ and its associated loudspeaker is represented by the curve $T_2$ of Fig. 13. This curve has peaks at the low and high ends of the audio transmission characteristic.

The adjustable tap 103 is regulated to adjust the amplification of tubes 101 and 102 when the two audio systems operate as an acoustically-compensated system, the extreme high and low audio frequencies becoming relatively stronger in comparison with the middle frequency as the amplification and output are reduced. The arrangement in Fig. 12 is not restricted to the particular circuits or variable mu type tube shown, but any of the other tube constructions or circuits disclosed hereinbefore may be utilized for this purpose.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. A method of controlling the transmission of a pair of parallel signal transmission channels of different frequency response characteristics which include at least two electrode sections of different gain control characteristics, which comprises the step of varying the space current flow in each section with gain control biases of equal magnitude whereby the signal transmission through said channels is varied at different rates.

2. A method of controlling the signal transmission through a pair of transmission channels of different frequency response characteristics, each of which channels includes an amplifier and the amplifiers of the channels being of different gain control characteristics, which consists in deriving a gain control voltage from incoming signals, applying said voltage to said amplifiers with the same magnitude to vary the transmission through said channels at different rates thereby causing one of the response characteristics to predominate over the other.

3. A method of controlling the signal transmission through a pair of transmission channels of substantially opposite frequency response characteristics, each of which channels includes an amplifier and the amplifiers of the channels being of different gain control characteristics, which consists in deriving a gain control voltage from incoming signals, applying said voltage to said amplifiers with the same magnitude to vary the transmission through said channels at different rates thereby causing one of the response characteristics to predominate over the other.

4. A method of controlling the signal transmission through a pair of transmission channels of substantially inverse frequency response characteristics, each of which channels includes an amplifier and the amplifiers of the channels being of different gain control characteristics, which consists in deriving a gain control voltage from incoming signals, applying said voltage to said amplifiers with the same magnitude to vary the transmission through said channels at different rates, and combining the signal outputs of the channels in a common utilization network.

5. In combination with a source of signals and a demodulator, an amplifier network having its input coupled to the source and its output coupled to the demodulator, said network comprising at least two parallel signal transmission circuits of different frequency response characteristics, said circuits having gain control characteristics which are different, and means for varying the gain of each circuit whereby the signal transmission through said channels varies at different rates.

6. In combination with a source of signals and a demodulator, an amplifier network having its input coupled to the source and its output coupled to the demodulator, said network comprising at least two parallel signal transmission circuits having different selectivity characteristics, said circuits having gain control characteristics which are different, and means for varying the gain of each circuit whereby the signal transmission through said channels varies at different rates.

7. In combination with a source of signals and a demodulator, an amplifier network having its input coupled to the source and its output coupled to the demodulator, said network comprising at least two parallel signal transmission circuits having substantially inverse signal selectivity characteristics, said circuits having gain control characteristics which are different, and means responsive to variations in signal amplitude for varying the gain of each circuit whereby the signal transmission through said channels varies at different rates.

8. In combination with a source of signals and a demodulator, an amplifier network having its input coupled to the source and its output coupled to the demodulator, said network comprising at least two parallel signal transmission circuits, said circuits having gain control characteristics which are different, and means for varying the gain of each circuit with biases of equal value whereby the signal transmission through said channels varies at different rates, each of the parallel circuits including an electron dscharge device having a variable mu characteristic.

9. In combination with a source of signals and a demodulator, an amplifier network having its input coupled to the source and its output coupled to the demodulator, said network comprising at least two parallel signal transmission circuits, said circuits having gain control characteristics which are different, and means for varying the gain of each circuit whereby the signal transmission through said channels varies at different rates, the parallel circuits being of inverse selectivity characteristics, and each circuit including an electron discharge device of the variable mu type.

10. In combination with a source of signals and a demodulator, an amplifier network having its input coupled to the source and its output coupled to the demodulator, said network comprising at least two parallel signal transmission circuits, said circuits having gain control characteristics which are different, and means responsive to variations in signal amplitude for varying the gain of each circuit whereby the signal transmission through said channels varies at different rates, the parallel circuits being of inverse selectivity characteristics, and each circuit including an electron discharge device of the variable mu type.

11. In combination with a source of signals to be amplified and a utilization network, a pair of tubes having a common signal input circuit coupled to the signal source, each tube having a pair of electrode sections of different control characteristics, said network including at least two circuits of different frequency response characteristics, the outputs of like pairs of said sections of said tubes being connected to a predetermined one of the utilization circuits.

12. In combination a pair of parallel signal amplifying channels, a source of signals feeding said channels and a common utilization network coupled to the output of said channels, said channels having at least one common electron discharge tube which is provided with at least two electrode sections which have different control characteristics, and means responsive to signal amplitude variations for impressing substantially equal gain control grid biases on the two sections whereby a change in bias has a greater effect on the signal transmission through one of the parallel channels than through the other.

13. In combination with a source of audio frequency signals, an electron discharge tube provided with an input circuit coupled to said source, said tube having a plate electrode divided into at least two parts, at least two audio signal channels having different and suitably related frequency response characteristics, one of the plate parts being connected to one of said channels and the other part being connected to the remaining channel, the geometry of the tube being such that the gain from the signal input grid in the two plate circuits varies differently as the grid bias of the tube is changed, and means for varying the signal input grid bias of said tube.

14. A signal transmission network comprising at least two parallel signal circuits and a tube provided with a divided plate, each plate section being connected to a different one of said parallel signal circuits, the electron streams to the plate sections having different amplification factors, and means for varying the electron flow to the plate sections of said tube whereby the transmission through the parallel circuits varies at different rates.

15. In combination with a source of signals and a common utilization network, at least two parallel signal transmission channels, an electron discharge tube common to both channels, said tube being provided with a cathode, plate and a divided input grid said plate being connected to the utilization network, and the signal channels being connected to impress signal voltage on the divided grid, said divided grid being so constructed that one of the grid sections has greater control over the electron current flowing through it than the other, and means for varying the grid bias of said tube in response to signal amplitude variations whereby greater changes in grid bias produce a larger change in amplification with respect to one section of the grid than with respect to the other.

16. In combination with at least two transmission paths for alternating current energy of different frequency limits, said paths having different frequency response characteristics, an electron discharge repeater device in each path, the repeater devices having different amplification factors, and means for adjusting the gain of said devices with control biases of equal value.

RENE A. BRADEN.